United States Patent [19]

Chen

[11] Patent Number: 5,081,388
[45] Date of Patent: Jan. 14, 1992

[54] MAGNETIC INDUCTION MOTOR

[76] Inventor: Shew-Nen Chen, Fl. 3, No. 27-1, Lane 281, Ta Shun San Road, Kao Hsiung, Taiwan

[21] Appl. No.: 556,414

[22] Filed: Jul. 24, 1990

[51] Int. Cl.⁵ .............................................. H02K 1/22
[52] U.S. Cl. ..................................... 310/266; 310/156; 310/216; 310/254
[58] Field of Search ............... 310/266, 156, 157, 179, 310/180, 254, 261, 89, 216, 166

[56] References Cited

U.S. PATENT DOCUMENTS

| | | | |
|---|---|---|---|
| 3,538,364 | 11/1970 | Favereau | 310/266 |
| 4,234,808 | 11/1980 | Geppert | 310/156 |
| 4,347,457 | 8/1982 | Sakamoto | 310/156 |
| 4,517,484 | 5/1985 | Dacier | 310/266 |
| 4,633,109 | 12/1986 | Feigel | 310/266 |
| 4,714,853 | 12/1987 | Palmero | 310/266 |
| 4,757,220 | 7/1988 | Pouillange | 310/266 |
| 4,982,128 | 1/1991 | McDonald | 310/266 |

Primary Examiner—R. Skudy
Attorney, Agent, or Firm—Morton J. Rosenberg; David I. Klein

[57] ABSTRACT

This invention relates to a magnetic induction motor and in particular to one which utilizes permanent magnets fitted on a rotor in association with electromagnets mounted on a stator so that the opposite surfaces of the permanent magnets and the electromagnetic are of the same pole thereby repelling the rotor to rotate when current passes through the electromagnets.

1 Claim, 3 Drawing Sheets

MAGNETIC INDUCTION MOTOR

BACKGROUND OF THE INVENTION

It is found that prior art motors have the following drawbacks:

1. It is necessary to increase the current supply in order to start a motor, which will cause a large voltage drop thereby decreasing the quality of the power supply.
2. The coils may be burnt out if the rotor rotates at a low speed.

It is, therefore, an object of the present invention to provide an improved magnetic induction motor which may obviate and mitigate the above-mentioned drawbacks.

SUMMARY OF THE INVENTION

This invention relates to an improved magnetic induction motor.

It is the primary object of the present invention to provide a magnetic induction motor which applies the repulsion of like magnetic poles to rotate the rotor.

It is another object of the present invention to provide a magnetic induction motor which does not need a large current to start.

It is still another object of the present invention to provide a magetic induction motor which can be raised in speed simply by increasing the current supplied thereto.

It is a further object of the present invention to provide a magnetic induction motor of which the coil will not be burnt out as in the prior art motors even if the rotor rotates at a lower speed than the predetermined value.

Other objects and merits and a fuller understanding of the present invention will be obtained by those having ordinary skill in the art when the following detailed description of the preferred embodiment of the present invention is read in conjunction with the accompanying drawings.

DETAILED DESCRIPTION OF THE PREFERRED EMBODIMENT

Figure 1:
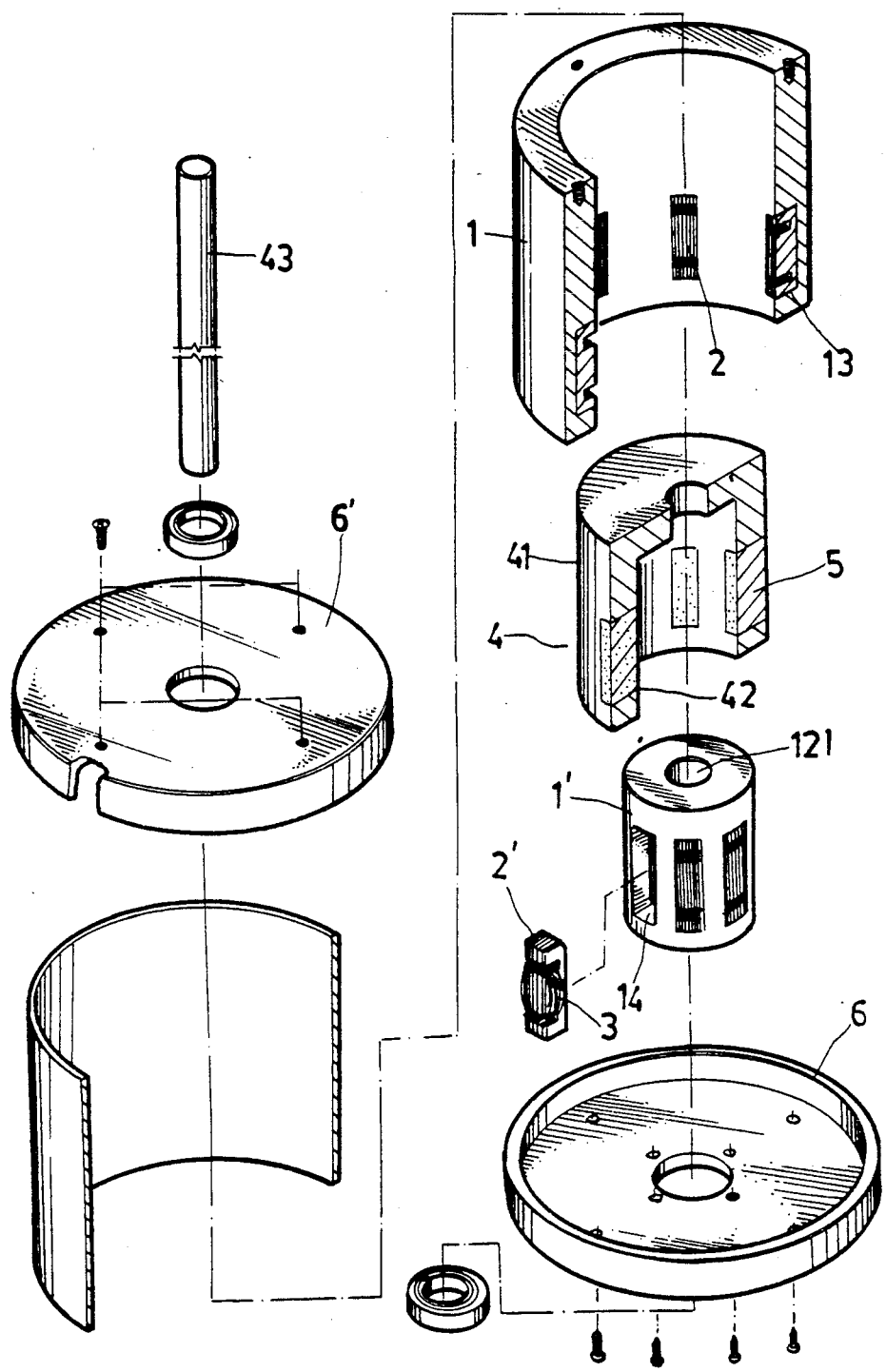
FIG. 1 is an exploded view of a magnetic induction motor according to the present invention.
Figure 2:
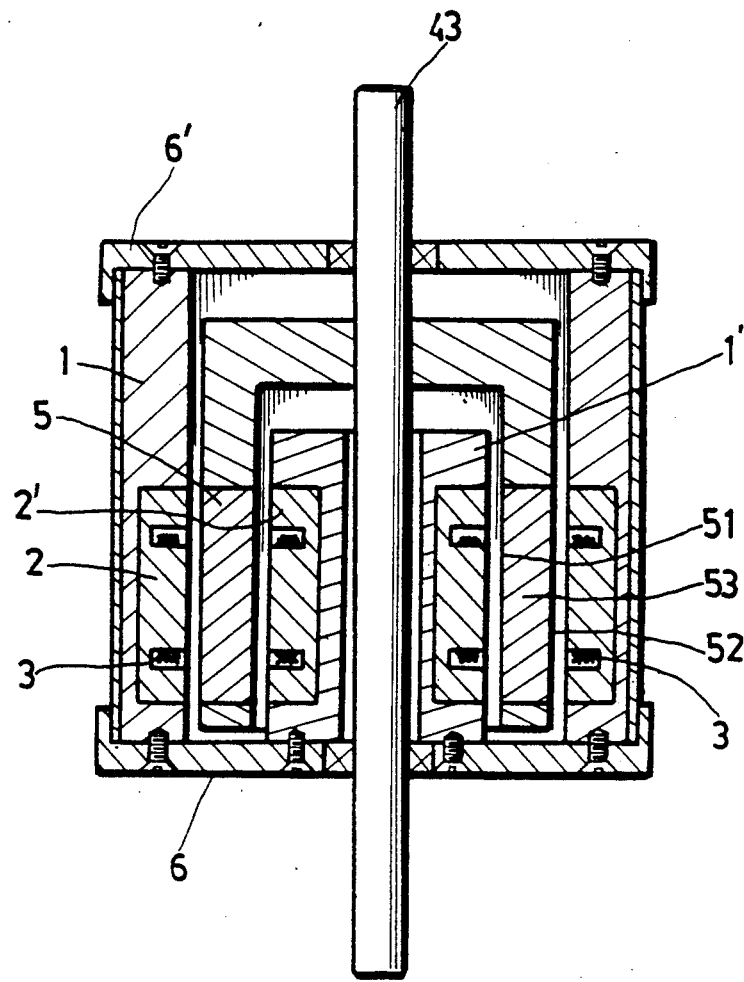
FIG. 2 is a longitudinal sectional view of the magnetic induction motor.

With reference to the drawings and in particular in FIG. 1 thereof, the magnetic induction motor mainly comprises an outer stator 1, an inner stator 1', a plurality of ferrite cores 2, and a rotor 4. Rotor 4 is secured to shaft 43 and held in axial alignment by bearings mounted in covers 6 and 6'. As shown in FIG. 2, the outer stator 1 is an annular member made of iron and provided with a plurality of recesses 13 spaced apart on the inner surface thereof. In each recess 13 there is fitted a ferrite core 2.

The inner stator 1' is cylindrical members made of iron having a center hole 121 and a plurality of recesses 14 for receiving the ferrite core 2'. The ferrite cores 2 and 2' are wound with a coil 3. The rotor 4 is provided on the cylindrical surface 41 of the rotor 4 with a plurality of recesses 42 in each of which is fitted a permanent magnet 5 which is designed so that both sides thereof is of the same pole while the center thereof is of the opposite pole. Further, the outer stator 1 and the inner stator 1' are fixed in position by covers 6 and 6'. The case and other component parts which are well known in the art will have no need to be described here in detail.

Figure 3A:
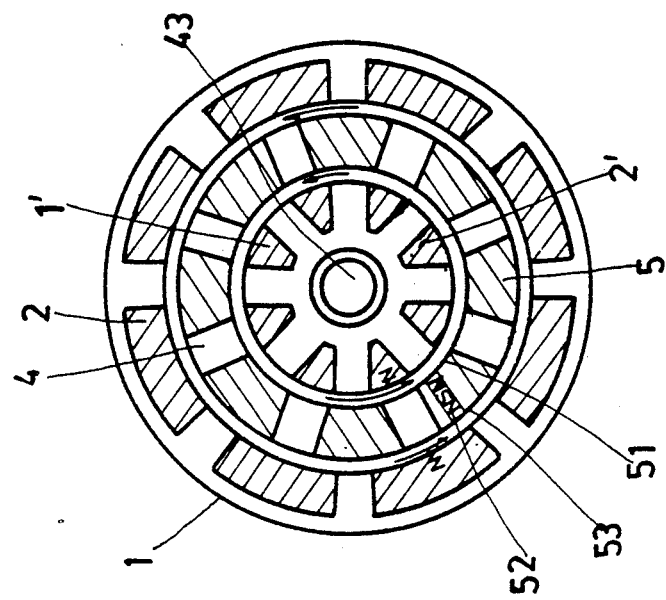
FIG. 3A shows the magnetic induction motor. The N poles of the rotor and stator are repelling each other—the result shown in FIG. 3B as the rotor turns.
Figure 3B:
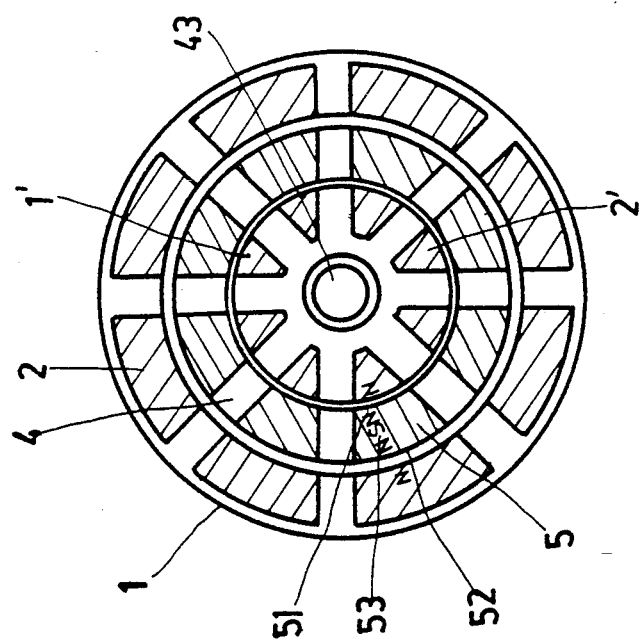

As shown in FIG. 2, the coils 3 of the ferrite cores 2 and 2' are wound into two separated circuitries so that when the power is turned on, the ferrite cores 2 and 2' of the outer stator 1 and inner stator 1' will become an electromagnet. Since the current passes through the coils 3 on the ferrite cores 2 and 2' in the same direction, the ferrite cores 2 and 2' will be of the same pole. For instance, if the surface of the ferrite cores 2 and 2' opposite to the rotor 4 is of the N pole, the ferrite cores 2 and 2' will be of the same pole, the surfaces 52 and 51 of the permanent magnet 5 on the rotor 4 opposite to the outer stator 1 and inner stator 1' will be of the N pole and the central portion 53 of the permanent magnet 5 will be of the S pole. Meanwhile, by the principle of the like poles repulsion and unlike poles attration, the rotor 4 will be repelled alternately by the outer stator 1 and inner stator 1' thereby rotating the rotor 4. FIG. 3A shows the initial alignment of permanent magnet rotor 4 with the like poles of inner stator 1' and outer stator 1 in radial alignment and providing a repelling force. As current is applied to coils 3 mounted on ferrite core 2 and 2' shown in FIG. 2, the rotor 4 rotates and continues to rotate to provide motor actuation.

As the start of the motor according to the present invention is achieved by magnetic repulsion, it is unnecessary to supply a large electric current thereto in order to start the motor thus enhancing the efficiency. When desired to decrease the speed of the motor, simply cut off the power supply to the coil on certain ferrite cores. In addition, since the coils are supplied by a fixed amount of current, the coil will not be burnt out even if the rotor rotates at a lower speed than the predetermined value.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A magnetic induction motor comprising:
   a plurality of ferrite cores each of said ferrite cores wound with a coil;
   an outer stator made of iron and provided with a plurality of recesses spaced apart on an inner surface thereof, each of said recesses for receiving a respective one of of said plurality of said ferrite cores;
   an inner stator formed of iron and having a center through hole for receiving a shaft therein, said inner stator having a plurality of recesses for receiving a respective one of said plurality of ferrite cores;
   a rotor coupled to said shaft for rotation between said inner and outer stators, said rotor provided with a plurality of recesses in each of which is disposed a permanent magnet, each of said permanent magnets having opposing pole surfaces magnetized to be of like polarity, each of said opposing pole surfaces to interface with a respective inner or outer stator surface; and
   a pair of covers for mounting said outer stator and said inner stator.

* * * * *